United States Patent
Kazmi et al.

(10) Patent No.: US 8,391,877 B2
(45) Date of Patent: Mar. 5, 2013

(54) MEASUREMENT-ASSISTED DYNAMIC FREQUENCY-REUSE IN CELLULAR TELECOMMUNICATIONS NETWORKS

(75) Inventors: Muhammad Kazmi, Bromma (SE); Arne Simonsson, Gammelstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/411,768

(22) Filed: Mar. 5, 2012

(65) Prior Publication Data
US 2012/0225661 A1     Sep. 6, 2012

Related U.S. Application Data

(63) Continuation of application No. 12/293,443, filed as application No. PCT/SE2007/050173 on Mar. 20, 2007, now Pat. No. 8,155,659.

(60) Provisional application No. 60/743,616, filed on Mar. 21, 2006.

(51) Int. Cl.
    *H04W 40/00* (2009.01)
(52) U.S. Cl. ........ 455/447; 370/252; 370/341; 455/423; 455/450; 455/452.1; 455/452.2
(58) Field of Classification Search .......... 455/446, 455/447, 450, 451, 452.1, 452.2, 453, 454, 455/455, 456; 370/252, 341
See application file for complete search history.

(56) References Cited

U.S. PATENT DOCUMENTS

| | | | |
|---|---|---|---|
| 5,038,399 A | 8/1991 | Bruckert | 455/447 |
| 5,953,661 A | 9/1999 | Schwinghammer et al. | 455/423 |
| 6,334,057 B1 | 12/2001 | Malmgren et al. | 455/450 |
| 6,925,068 B1 | 8/2005 | Stanwood et al. | |
| 2003/0087647 A1 | 5/2003 | Hurst | 455/456 |
| 2004/0196793 A1 | 10/2004 | Lucidarme et al. | 370/252 |
| 2004/0198364 A1 | 10/2004 | Shih et al. | |
| 2005/0043035 A1 | 2/2005 | Diesen et al. | 455/454 |
| 2006/0056373 A1 | 3/2006 | Legg | 370/341 |

FOREIGN PATENT DOCUMENTS
EP     166286 A1     5/2006

*Primary Examiner* — Wesley Kim
*Assistant Examiner* — Dinh P Nguyen
(74) *Attorney, Agent, or Firm* — Rothwell, Figg, Ernst & Manbeck, P.C.

(57) ABSTRACT

A radio network resource controller directs a first network node associated with a first cell region, or a wireless terminal in communication through the first cell region, to measure and report radio resource-related data selected from the group consisting of: resource activity per channel; the number of transmitted power samples that exceed a threshold over a measurement period; and, channel quality samples that exceed a quality threshold. The controller then receives at least one measurement report of the radio resource-related data and, as a function of the radio resource-related data in the first cell region, dynamically reallocates the distribution of resources, such as radio-frequency channels, between the first cell region and at least a second cell region. The invention has a particular advantage in TDD mode of operation where efficient and dynamic interference mitigation is needed to combat the inherent mobile-to-mobile and base station-to-base station interference.

31 Claims, 4 Drawing Sheets

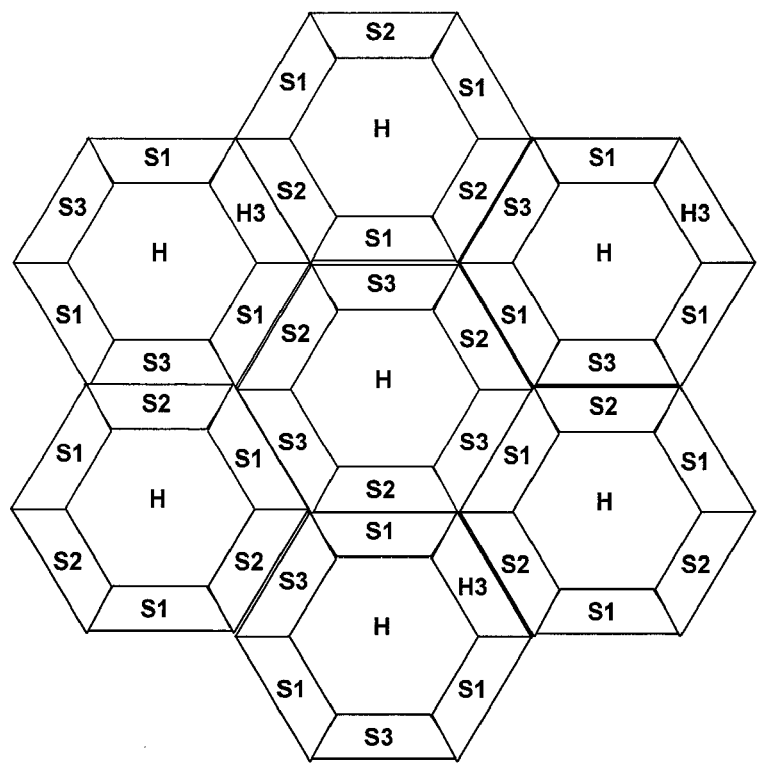
Figure 3
☐ Low activity region          ▨ Overload region
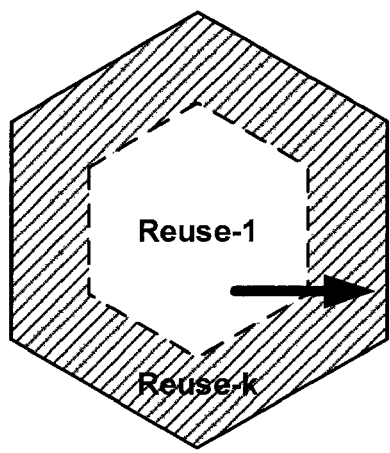
Figure 4-A
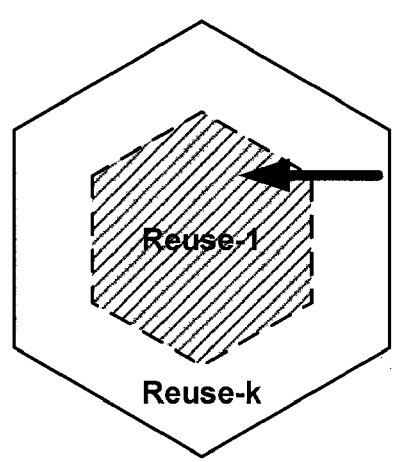
Figure 4-B

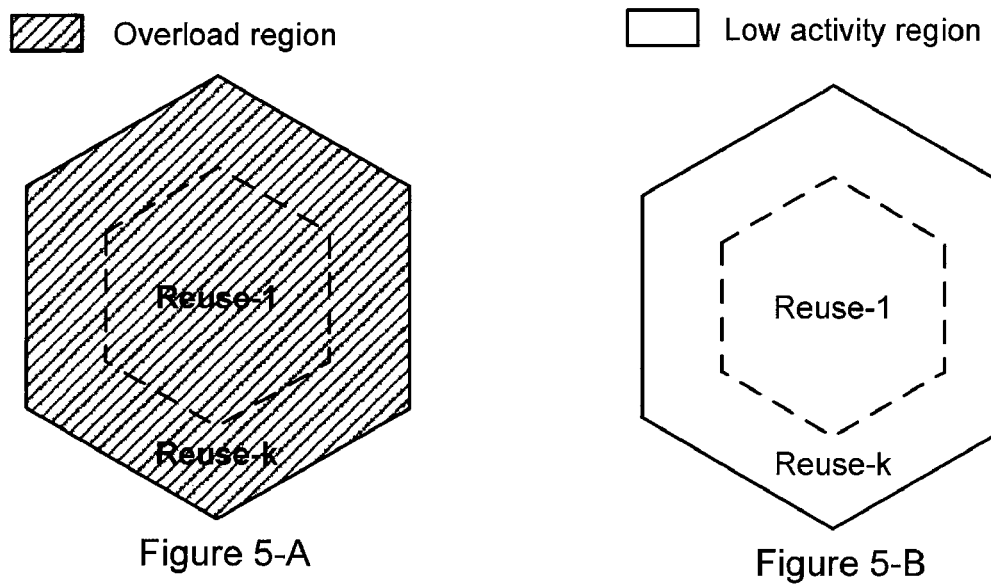
Figure 5-A
Figure 5-B
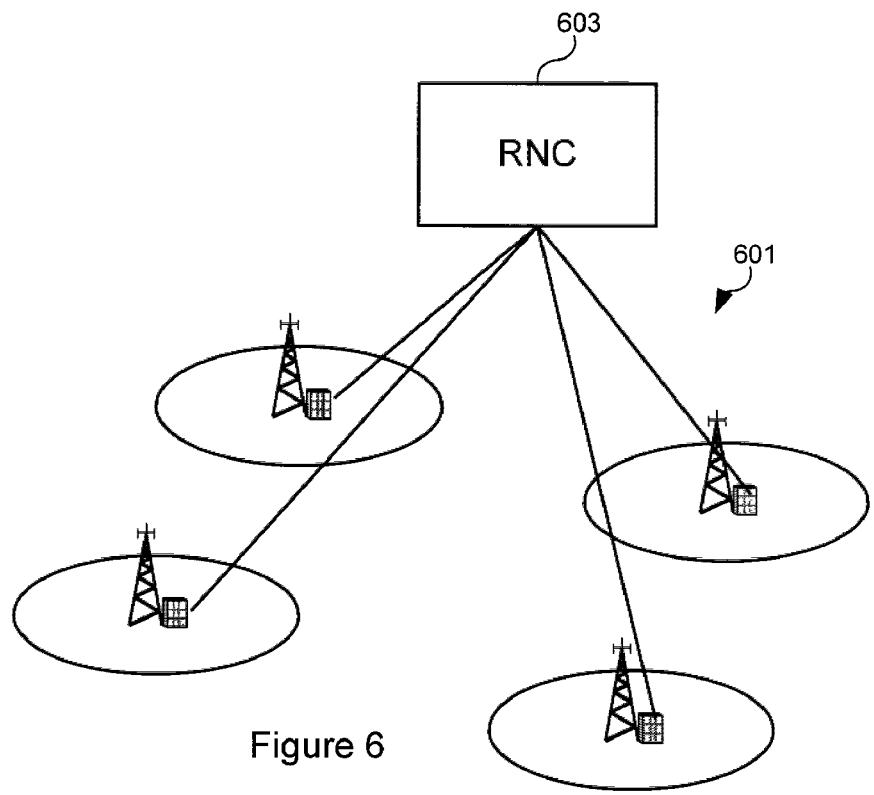
Figure 6

MEASUREMENT-ASSISTED DYNAMIC FREQUENCY-REUSE IN CELLULAR TELECOMMUNICATIONS NETWORKS

CROSS-REFERENCE TO RELATED APPLICATIONS

This application is a continuation of pending patent application Ser. No. 12/293,443, filed on Sep. 18, 2008, which is a §371 National Phase Application from PCT/SE2007/050173, filed Mar. 20, 2007, and designating the United States, which claims priority to U.S. Ser. No. 60/743,616, filed Mar. 21, 2006. The aforementioned applications are incorporated by reference herein in their entirety.

TECHNICAL FIELD OF THE INVENTION

The invention is related, in general, to the field of wireless telecommunications and, in particular, to improvements in frequency-reuse in cellular telecommunications.

BACKGROUND

Frequency reuse patterns are cell-based schemes for assigning the frequency channels available within a particular cellular telecommunications system. The most basic unit of any frequency reuse pattern is a cell. Each cell within a frequency reuse pattern is assigned a number of frequency channels. A plurality of cells are then associated together and referred to as a cluster and utilizes all of the frequency channels available to a particular cellular telecommunications system. Groups of clusters are then used to provide a cellular coverage area within the cellular telecommunications system and the frequency channels allocated for one cluster are reused in other clusters. The scheme for recycling or reassigning the frequency channels throughout the serving coverage area is referred to as a reuse plan. The distance between a first cell using a particular frequency channel within a first cluster and a second cell using the same frequency channel within a second cluster is further known as a reuse distance.

The reuse of the same frequency channels by a number of different cells implies that cells may suffer from co-channel interferences. It is therefore desirable for the received strength of the serving carrier (C) within each cell to be higher than the total co-channel interference level (I). As a result, the higher the carrier to interference (C/I) value, the better the speech quality. A higher C/I value is obtained partly by controlling the channel reuse distance. The larger the reuse distance between adjacent cells utilizing the same frequency channels, the lesser the co-channel interferences created between those cells. The C/I ratio is further related to a frequency reuse plan (N/F) where N indicates the number of sites included within a single cluster and F indicates the number of frequency groups. For example, the C/I ratio is directly related to the following equation: $D_R = (3*F)^{1/2} R$, where: $D_R$ is the reuse distance; F is the number of frequency groups; and, R is the radius of a cell. Accordingly, the larger the F value, the greater the reuse distance. However, it is not always desirable to use a larger F value to increase the C/I ratio. Since the total number of available frequency channels (T) is fixed within a particular mobile network, if there are F groups, then each group will contain T/F channels. As a result, a higher number of frequency group (F) would result in a fewer channels per cell and lesser call capacity. Furthermore, in a packet data cellular system (such as in Evolved UTRA) packet transmission takes place over a shared channel where resources are shared by several users. This means a very large number of users may have to compete for the limited resources, reducing peak user bit rate and thereby increasing the packet delay transmission. Increased packet delay is undesirable as it adversely affects the service quality.

For most cellular systems, capacity is not a major issue when the system initially goes into operation. Therefore, in order to achieve a high C/I value and to improve the quality of speech connection, a high frequency reuse plan (N/F), such as 9/27, is initially used. However, as the capacity increases, the cellular telecommunications network has to resort to a lower frequency reuse plan, such as a 7/21 or 4/12, to allocate more frequency channels per cell. Moreover, the success of such systems requires that they are able to offer high peak bitrate and shorter packet transmission delay already during their initial deployment.

In cellular communication there are generally two main modes of operation for duplex transmission on uplink and downlink: Frequency Division Duplex (FDD) and Time Division Duplex (TDD), with their usage typically dependent on the frequency band used. FDD uses paired band where uplink and downlink transmission takes place at different carrier frequencies. Generally, there is also a fixed relation between a frequency band used for uplink and downlink transmission. TDD is used on unpaired bands where common carrier frequency is used for uplink and downlink transmission. One potential advantage with TDD is that frequency bands are more efficiently used. Secondly, the total available radio resources which are defined in terms of uplink and downlink time slots can be dynamically interchanged. This means asymmetric traffic between uplink and downlink can be better handled by adjusting uplink and downlink capacity (i.e., time slots).

Accordingly, there is a need in the art for improved methods, and systems for employing such methods, to optimize frequency reuse in cellular communications systems.

SUMMARY OF THE INVENTION

To overcome the deficiencies of the prior art, the present invention discloses methods for dynamically distributing resources to a plurality of cell regions in a cellular communications network. The novel method can be implemented in a conventional radio network resource controller, such as a Radio Network Controller, or other node, in a Global System for Mobile communications (GSM) and Evolved Universal Terrestrial Radio Access Network (E-UTRAN) telecommunications network. The E-UTRAN will use orthogonal frequency division multiple access (OFDMA) in the downlink and single carrier frequency division multiple access (SC-FDMA) in the uplink. The E-UTRAN will employ both time division duplex (TDD) and frequency division duplex (FDD) mode of operations. In both OFDMA and SC-FDMA based systems, the available bandwidth is sub-divided into several resource blocks or units as defined, for example, in 3GPP TR 25.814: "Physical Layer Aspects for Evolved UTRA". According to this document, a resource block is defined in both time and frequency. According to the current assumptions, a resource block size is 180 KHz and 0.5 ms in frequency and time domains, respectively. The overall uplink and downlink transmission bandwidth can be as large as 20 MHz. The principles of the invention, however, are not limited to a particular technology standard, but are adaptable to most conventional wireless network topologies and technologies.

According to the general principles of the invention, a radio network resource controller directs a first network node associated with a first cell region, or a wireless terminal in communication through the first cell region, to measure and report radio resource-related data in the uplink or downlink, or both. The radio resource-related data is selected from the group consisting of: (1) resource activity per channel, wherein the resource activity per channel is defined as the ratio of the time during which a channel is scheduled to the measurement period; (2) aggregate resource activity per channel group, wherein the aggregate resource activity per channel group is defined as the average or x.sup.th percentile of the resource activity of all the channels in a group, over a measurement period; (3) the number of transmitted power samples that exceed a threshold over a measurement period; and, (4) channel quality samples, per channel in a neighboring cell region, that exceed a quality threshold over a measurement period. The radio network resource controller then receives at least one measurement report of the radio resource-related data. The radio network resource controller then, as a function of the radio resource-related data in the first cell region, dynamically reallocates the distribution of resources between the first cell region and at least a second cell region. The resources distributed by the radio network resource controller can be, for example, radio-frequency channels associated with uplink and downlink communications, whereby frequency reuse can be optimized in the network.

In one embodiment, the controller further specifies to the first network node at least one condition for which the node should report the resource activity per channel measurement. The condition can be, for example, the occurrence of the radio resource-related data exceeding a predetermined threshold; the radio resource-related data falling below a predetermined threshold; or, the signal quality for a specified resource exceeding a predetermined minimum over a predetermined period of time.

In particular embodiments, when the radio network resource controller directs a network node to measure and report radio resource-related data consisting of resource activity per channel, it requests that the measurement be performed for a plurality of channels and aggregated for reporting to the controller. Similarly, when the radio network resource controller directs a network node to measure and report resource-related data consisting of the number of transmitted power samples, it can request that the node measure and report the transmitted power samples exceeding a threshold for a plurality of channels and aggregate the measurements for reporting to the controller. Likewise, when the radio network resource controller directs a network node to measure and report resource-related data consisting of channel quality samples, it can request that the node measure and report channel quality samples for a plurality of channels in neighboring cell regions and aggregate the measurements for reporting to the controller.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form, as defined by the claims provided hereinafter.

BRIEF DESCRIPTION OF THE DRAWINGS

A more complete understanding of the method and apparatus of the present invention may be had by reference to the following detailed description when taken in conjunction with the accompanying drawings, wherein:

FIG. 3 illustrates a second exemplary dynamic frequency-reuse scheme;

FIGS. 4-A and 4-B illustrate exemplary scenarios for triggering frequency-reuse re-allocation;

FIGS. 5-A and 5-B illustrate exemplary scenarios for triggering frequency-reuse re-allocation;

FIG. 6 illustrates a first network topology in which the principles of the invention can be implemented;

DETAILED DESCRIPTION OF THE DRAWINGS

Figure 1:
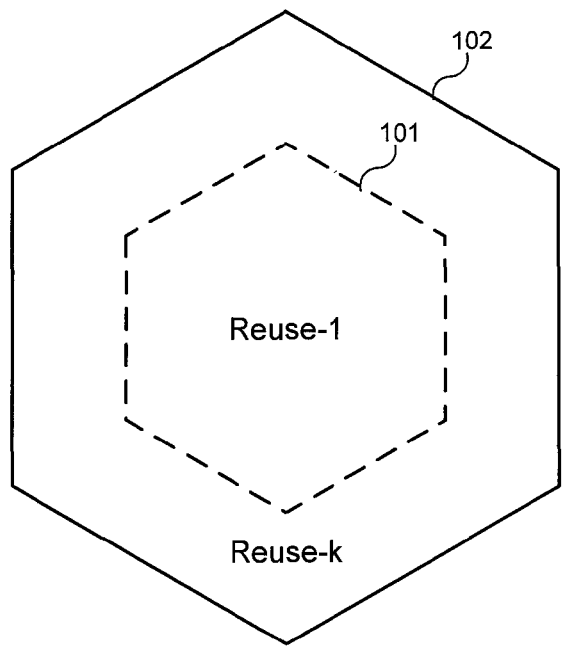
FIG. 1 illustrates an exemplary cell having two frequency-reuse regions.

In a simple scenario, sets of channels (i.e., carrier frequencies) are assigned to each cell with a certain frequency reuse pattern. In this case, there is no partition within the cell in terms of channel assignment and the assigned carrier frequencies can be used throughout the cell. In another scenario, as illustrated in FIG. 1, a cell can be divided into two (or more) regions. In the example illustrated in FIG. 1, the two regions are concentric. In the inner region 101 of the cell, the frequency reuse is 1, whereas in the outer region 102 (cell border region) frequency reuse is k (k>1). In the downlink for a given service, a user equipment (UE; e.g., a wireless terminal) requires lower base station transmitted power in the inner region compared to that in the outer region (i.e. cell border region) of the cell. In accordance with UE position and mobility profile, the base station transmitted power is generally controlled by dynamically compensating the loss due to distance and fading behavior. In the uplink, power control can also be used; i.e., a UE transmits with lower power when close to the cell and with higher power when in the cell border region. The main advantage of this approach is that carriers are more efficiently utilized and interference in the cell border is minimized. In principle, a cell can be divided into multiple frequency reuse regions. The most usual and practical scenario, however, is that of two partitions as illustrated in FIG. 1. One problem with conventional frequency reuse schemes is that fixed resource assignment in different reuse regions leads to inefficient resource utilization. This is due to the fact that loads in different regions (e.g., inner cell and cell border regions) can vary over time, but the resources are not reassigned between different regions on a dynamic basis.

Utilizing two different reuse partitions in a cell significantly reduces inter-cell interference in the cell border. There is, however, throughput degradation due to the fixed resource assignment in different partitions. The present invention recognizes that efficient realization of dynamic, or semi-dynamic, variable frequency reuse requires measurement reports from radio base stations, or access points, and possibly user terminal measurements. Conventional measurements, such as cell load, transmit power, received power, and Block Error Rate (BLER), however, are not sufficient for a dynamic frequency reuse scheme.

According to the principles of the invention, certain measurements performed by radio access points or user terminals are reported to a controller on a periodic basis or in response to a predefined triggering event. Based on the reported measurements (e.g., resource activity), the controller dynamically distributes resources between cell regions with different frequency reuse. The controller can further improve the resource assignment in different regions by utilizing other measurements, such as transmitted power statistics above a predefined threshold or channel quality statistics in neighboring cells above a threshold.

Figure 2:
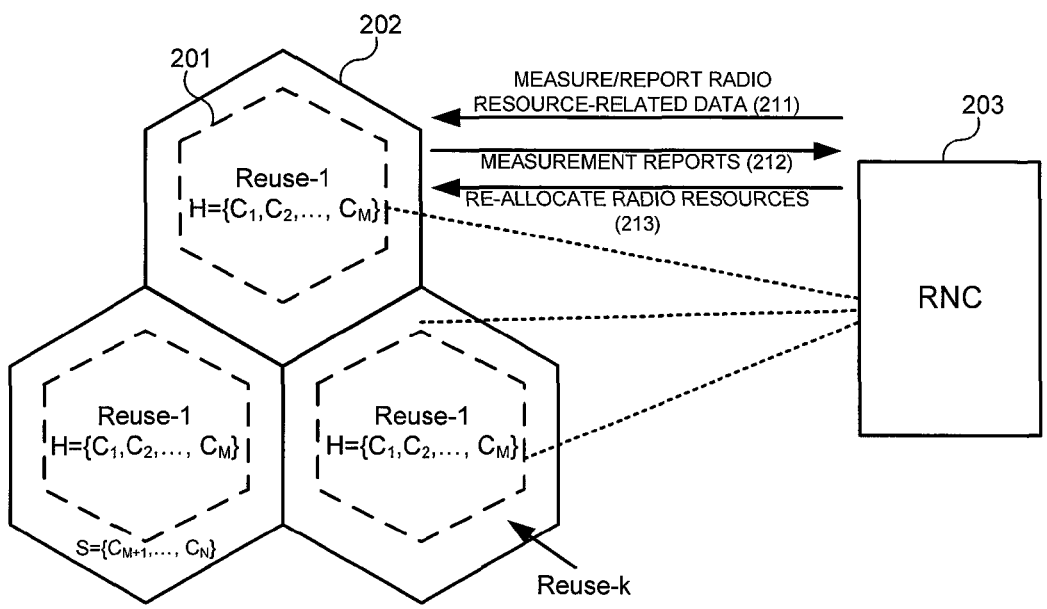
FIG. 2 illustrates a first exemplary dynamic frequency-reuse scheme.

Referring now to FIG. 2, illustrated is a first exemplary dynamic frequency-reuse scheme. In this example, each cell is partitioned into two regions 201, 202 for the purpose of resource assignment. The cell border region 202 of each cell can be defined by any state-of-the art technique, such as those based on the measurement reporting of received signal strength or received quality measured by a user terminal on a common pilot signal. In this example, let $GE.epsilon.\{C.sub.1, C.sub.2, \ldots, C.sub.N\}$ be the set of available channels (e.g., frequency carriers/frequency chunks/time-frequency resource block) to be assigned by a resource controller 203 to each cell with two partitions; in this example, the resource controller 203 is a Radio Network Controller (RNC) in a Global System for Mobile Communications (GSM) cellular network. Set G is divided into two sub-sets of resources: H and S, where set $H.epsilon.\{C.sub.1, C.sub.2, \ldots, C.sub.M\}$ is initially assigned to the inner cell region 201 with reuse-1 and set $S.epsilon.\{C.sub.M+1, \ldots, C.sub.N\}$ is initially assigned to the cell border region 202 with reuse-k. The RNC 203 then directs each network node, such as a radio base station, associated with cell region, or a wireless terminal in communication through said each cell region, to measure and report radio resource-related data (211), as described hereinafter. The RNC 203 then receives measurement reports from the network nodes, or wireless terminals, of the radio resource-related data. In response, the RNC 203 then dynamically reallocates the distribution of resources between cell regions as a function of the radio resource-related data.

It should be noted that the channel assignments to different cell regions can be carried out independently for uplink and downlink channels. The interference relation can be different for uplink channels than for downlink channels. Furthermore, cell regions other than concentric cells may be an alternative, such as illustrated in FIG. 3. In the example depicted in FIG. 3, each cell includes a sub-region per neighboring cell, and S is divided into a 3-reuse with S1, S2 and S3. Only one of the S-sets, however, is used in the adjacent areas of surrounding cells in order to achieve lower uplink interference for the other two subsets.

In order to dynamically switch the radio resources between different cell regions, the radio access point (e.g., radio base station) associated with the cell, and/or a wireless terminal in communication through the cell, performs certain radio resource-related data measurements which are reported to a radio network resource controller. According to the invention, the radio resource-related data can be: (1) resource activity per channel, wherein the resource activity per channel is defined as the ratio of the time during which a channel is scheduled to the measurement period; (2) aggregate resource activity per channel group, wherein the aggregate resource activity per channel group is defined as the average or x.sup.th percentile of the resource activities of all the channels in a group over a measurement period; (3) the number of transmitted power samples that exceed a threshold over a measurement period; and, (4) channel quality samples, per channel in a neighboring cell region, that exceed a quality threshold over a measurement period.

For resource activity per channel data, the radio network resource controller directs a radio access point to measure and report resource activity per channel (.mu.) in each cell region, where the resource activity per channel (.mu.) is defined as the ratio of the time during which a channel (e.g., time-frequency resource block, frequency chunk) is scheduled (T.sub.s) to the measurement time period (T.sub.m) The measurement period T.sub.m can be set by the radio network resource controller or can be a default value. The time during which a channel is scheduled T.sub.s is measured in the radio access point by a scheduler. The radio access point can measure the resource activity (.mu.) of all channels used in both downlink and uplink The radio network resource controller can specify a number of parameters and events to the radio access point for the purpose of resource activity (.mu.) measurement reporting. For example the radio access point can be directed to: report resource activity (.mu.) if it's above a certain threshold (.mu.>x.sub.1); report resource activity (.mu.) if it's below a certain threshold (.mu.<x.sub.2); or report resource activity (.mu.) on carriers/chunks whose quality is above a minimum signal quality level (.gamma. . . . sub.min) over time T.sub.1. The parameters x.sub.1, x.sub.2, .gamma. . . . sub min and T.sub.1 can be set by the radio network resource controller or can be default values used by the radio access point. Using the same principles as stated above, the radio network resource controller can also request a radio access point to report aggregate resource activity per channel group. It indicates the overall activity of K (K>1) channels. A channel group is a set of at least two or more contiguous or non-contiguous channels in the frequency domain. A group may also comprise all channels used in one cell region; in this embodiment, the measurement would depict the global resource utilization status of several, or all, channels in a cell region. The main advantage of aggregate resource activity per channel group is that it requires less signaling overhead.

The scheduling of channels (e.g., time-frequency resource block, chunk) to the users is carried out by a scheduler, which is located at the base station. Therefore, the base station can easily measure resource activity both on uplink and downlink channels and report the results to the network controller.

The radio access point reports the resource activity per channel and a corresponding resource identification (ID) to the radio network resource controller. Similarly, the radio access point reports the aggregate resource activity per channel group and a corresponding resource group identification (G-ID) or region ID to the radio network resource controller. The measurement reporting can be either event triggered, where an event is specified by the system parameters, or it can be periodic. The event-triggered approach reduces the signaling overheads between the radio access point and the radio network resource controller. Based on resource activity reports, the radio network resource controller can then reallocate channels in different cell regions.

For transmitted power samples that exceed a threshold over a measurement period data, the radio network resource controller directs a radio access point or wireless terminal to measure and report the number of transmitted power samples which are above a certain threshold, measured per channel, over a measurement period (T.sub.m). The measurement is performed by a wireless terminal for uplink transmit power statistics and by a radio access point for downlink transmit power statistics. In both cases, the radio network resource controller sets the power threshold and the measurement period. Transmitted power sample data can also be aggregated, in which case the power statistics are collected for all channels used in a cell region over the measurement period. A wireless terminal will report this measurement only for the channels allocated to it, while a radio access point can collect power statistics for all downlink channels.

For channel quality samples, per channel in a neighboring cell region, that exceed a quality threshold over a measurement period, the radio network resource controller directs a wireless terminal to measure and report the number of channel quality samples which are above a certain threshold, measured per channel in a neighbor cell, over a measurement period ($T_m$). The criteria to estimate the channel quality can be based on received total power on the channel, carrier-to-interference ratio (CIR); and, received signal strength indication (RSSI), radio link level block error rate (BLER), packet loss rate, etc. The radio network resource controller specifies the thresholds, measurement period and neighbor cells Channel quality sample data can also be aggregated, in which case the channel quality statistics are collected for all channels used in a neighbor cell over the measurement period. The measurement is performed by a wireless terminal for downlink channels and by a radio access point for uplink channels.

Various algorithms are known in the prior art that can be used by a radio network resource controller to reallocate resources as a function of the radio resource-related data included in measurement reports according to the principles of the invention. The measurements can be used to assist the radio network resource controller in dynamic, or semi-dynamic, assignment of channels in different cell regions. The assigned resources can then be utilized by the scheduler for the corresponding cell region.

FIGS. 4-A and 4-B illustrate exemplary scenarios for triggering frequency-reuse re-allocation. As illustrated in those figures, the resource activity per channel ($\mu$) reports indicate to the radio network resource controller that an overload situation exists in the outer cell region (4-A) or the inner cell region (4-B). The radio network resource controller can then dynamically reallocate radio resources between those cell regions to balance the load.

FIGS. 5-A and 5-B illustrate further exemplary scenarios for triggering frequency-reuse re-allocation. As illustrated in those figures, if resource activity is high (5-A) or low (5-B) in both inner cell and outer cell regions, the radio network resource controller can still reallocate radio resources between different cell regions. In such cases, carrier reassignment can, for example, be based on quality level. For instance, the carrier whose quality is above a certain threshold ($\gamma_1$) or below another threshold ($\gamma_2$) can be assigned to the cell border region, or vice versa. The parameters $\gamma_1$ and $\gamma_2$ can be set either by the radio network resource controller or then can be default parameters.

Figure 7:
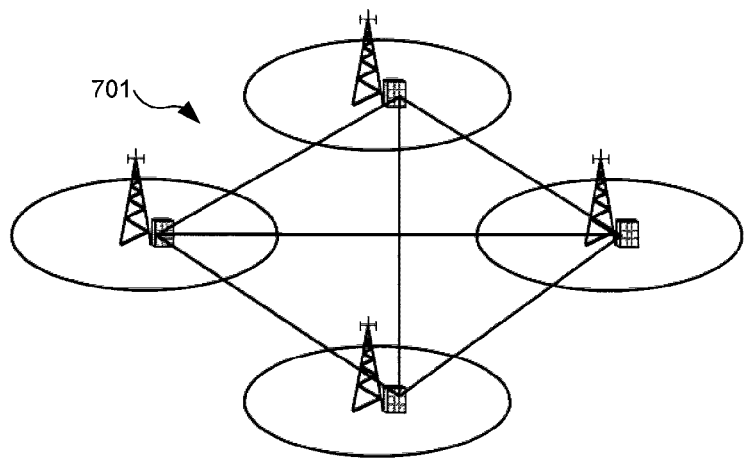
FIG. 7 illustrates a second network topology in which the principles of the invention can be implemented; and, FIG. 8 illustrates an exemplary method for dynamic frequency-reuse re-allocation in accordance with the principles of the invention.

FIG. 6 illustrates a first network topology in which the principles of the invention can be implemented. In this embodiment, the radio access network architecture is characterized by a central radio network resource controller, such as a Radio Network Controller (RNC) 603 in a Global System for Mobile Communications (GSM) telecommunications network, which controls a plurality of radio access points 601, such as GSM Radio Base Stations (RBS). In principle, however, the principles of the invention can also be implemented in a distributed architecture, without a central controller, wherein one or more nodes function as the radio network resource controller; such a network is illustrated in FIG. 7. In that embodiment, the measurements are exchanged directly between the radio access points. Measurements can also be exchanged between the radio access points via wireless terminals (not shown). In such embodiments, the measurement reports from a radio access point can be broadcast to all wireless terminals or directly transmitted to one or more specific terminals. The wireless terminals can then pass this information to other neighboring radio access points or to other wireless terminals in a neighboring cell, which can then pass it to their own wireless access points. The wireless access points can in this way mutually decide which resources are to be allocated in different cell regions.

Figure 8:
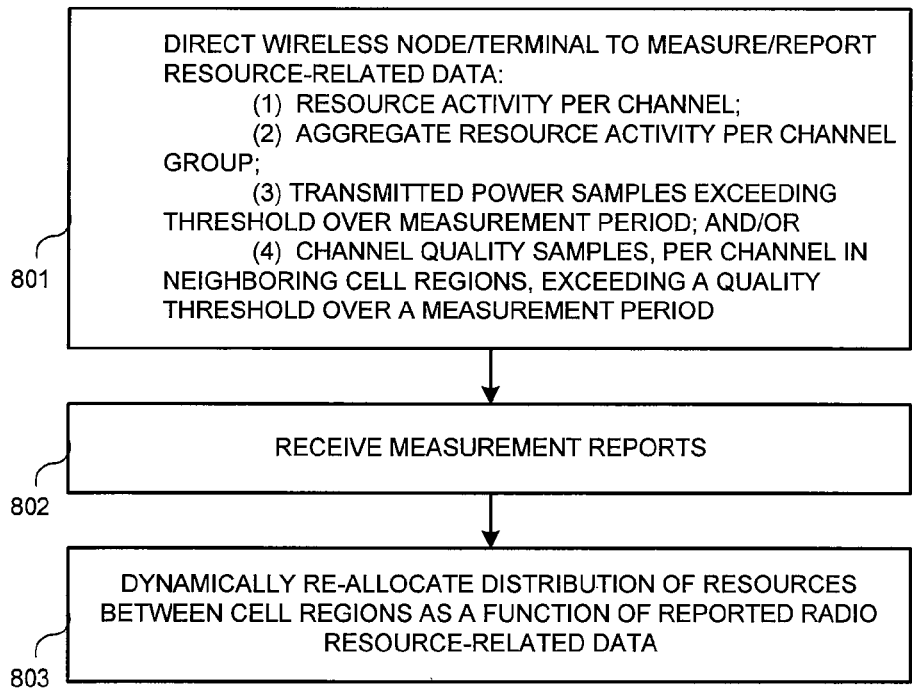

Finally, reference is to FIG. 8, which summarizes the exemplary method described herein for dynamic frequency-reuse reallocation in accordance with the principles of the invention. In step 801, a radio network resource controller directs a first network node associated with a first cell region, or a wireless terminal in communication through the first cell region, to measure and report radio resource-related data. The radio resource-related data is selected from the group consisting of: (1) resource activity per channel, wherein the resource activity per channel is defined as the ratio of the time during which a channel is scheduled to the measurement period; (2) aggregate resource activity per channel group, wherein the aggregate resource activity per channel group is defined as the average or $x^{th}$ percentile of the resource activities of all the channels in a group over a measurement period; (3) the number of transmitted power samples that exceed a threshold over a measurement period; and, (4) channel quality samples, per channel in a neighboring cell region, that exceed a quality threshold over a measurement period. Next, in step 802, the radio network resource controller receives at least one measurement report of the radio resource-related data. In step 803, the radio network resource controller, as a function of the radio resource-related data in the first cell region, dynamically reallocates the distribution of resources between the first cell region and at least a second cell region.

The cell regions in uplink and downlink are not necessarily equal in size. Also, depending upon the type of services in operation, the traffic load can be asymmetrical in uplink and downlink directions. In FDD mode, the measurements are independently performed on uplink and downlink radio resources. This means in FDD the interference mitigation based on the measurements shall be done independently on uplink and downlink. In TDD mode, separate measurements are also to be done on uplink and downlink radio resources (i.e., uplink and downlink slots). But since radio resources (time slots) are shared between uplink and downlink, the interference mitigation would require efficient and dynamic coordination between uplink and downlink channel allocation in the time domain in step 803 (i.e., increase uplink and decreasing downlink time slots, or vice versa). Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

The invention claimed is:

1. A method for distributing resources in a cellular communications network, the method comprising:
    directing, by a first network node, a second network node associated with a first cell region to report radio resource-related data, wherein said radio resource-related data comprises one or more of:

resource activity per channel, wherein the resource activity per channel is defined as the ratio of the time during which a channel is scheduled to the measurement period;

aggregate resource activity per channel group, wherein the aggregate resource activity per channel group is defined as the average or xth percentile of the resource activities of all channels in a group over a measurement period;

the number of transmitted power samples that exceed a threshold over a measurement period; and channel quality samples, per channel in a second cell region that neighbors the first cell region, that exceed a quality threshold over a measurement period;

receiving, at said first network node, at least one measurement report of said radio resource-related data; and re-allocating, by said first network node, the distribution of resources among said first cell region and one or more other cell regions as a function of said radio resource-related data in said first cell region.

2. The method of claim 1, further comprising the step of said first network node specifying to said second network node at least one condition for which said second network node should report said resource activity per channel measurement.

3. The method of claim 2, wherein said condition is selected from a group comprising:
said radio resource-related data exceeds a predetermined threshold;
said radio resource-related data falls below a predetermined threshold; and,
a signal quality for a specified resource exceeds a predetermined minimum over a predetermined period of time.

4. The method of claim 1, wherein said step of directing said second network node to report said radio resource-related data comprising resource activity per channel comprises the step of directing said second network node to measure said resource activity for a plurality of channels over a measurement period and aggregate the measurements for reporting to said first network node.

5. The method of claim 4, wherein said aggregated measurement is the average or xth percentile of the resource activities of all channels included a group.

6. The method of claim 4, wherein said plurality of channels may be contiguous or non-contiguous in the frequency domain.

7. The method of claim 6, wherein said plurality of channels comprise all channels used in one cell region.

8. The method of claim 1, wherein said step of directing the second network node associated with said first cell region to report said radio resource-related data comprises the step of directing said second network node to measure and report said transmitted power samples exceeding said threshold for a plurality of channels and aggregate the measurements for reporting to said first network node.

9. The method of claim 1, wherein said step of directing said wireless terminal in communication through said first cell region to report said radio resource-related data comprises the step of directing said wireless terminal to measure and report said channel quality samples for a plurality of channels in said neighboring cell region and aggregate the measurements for reporting to said first network node.

10. The method of claim 1, wherein said quality threshold is defined by a criteria selected from a group comprising:
received total power on a channel;
carrier-to-interference ratio (CIR);
received signal strength indication (RSSI);
block error rate (BLER); and,
packet loss rate.

11. The method of claim 1, wherein said first network node comprises a centralized Radio Network Controller for directing a plurality of network nodes to measure and report said radio resource-related data.

12. The method of claim 1, wherein said first network node is co-located in said second network node, said second network node communicating with further network nodes to instruct such further network nodes to measure and report said radio resource-related data.

13. The method of claim 1, wherein said resources comprise radio-frequency channels.

14. The method of claim 1, wherein said resources comprise time-frequency channels.

15. The method of claim 1, wherein said resources comprise time slots.

16. The method of claim 1, wherein uplink and downlink channels are allocated using paired radio spectrum.

17. The method of claim 1, wherein uplink and downlink channels are allocated using unpaired radio spectrum.

18. The method of claim 17, wherein channel re-allocation is performed such that the channels are shared between uplink and downlink regions.

19. The method of claim 1, wherein the second network node is a wireless terminal in communication through said first cell region.

20. The method of claim 1, wherein the step of re-allocating the distribution of resources between said first cell region and one or more other cell regions comprises removing a channel from a set of channels assigned to said first cell region and adding said channel to a set of channels assigned to one of said other cell regions.

21. The method of claim 1, wherein said resources comprise a frequency carrier that is used by the second network node to transmit data directly to a wireless terminal.

22. A network node for allocating resources to a plurality of cell regions in a cellular communications network, said radio network resource controller comprising:
a directing unit configured to direct a second network node associated with a first cell region to report radio resource-related data, wherein said radio resource-related data is comprises one or more of:
resource activity per channel, wherein the resource activity per channel is defined as the ratio of the time during which a channel is scheduled to the measurement period;
aggregate resource activity per channel group, wherein the aggregate resource activity per channel group is defined as the average or xth percentile of the resource activities of all channels in a group over a measurement period;
the number of transmitted power samples that exceed a threshold over a measurement period; and
channel quality samples, per channel in a neighboring cell region, that exceed a quality threshold over a measurement period;
a receiver for receiving at least one measurement report of said radio resource-related data; and
a re-allocator configured to re-allocate the distribution of resources among said first cell region and one or more other cell regions as a function of said radio resource-related data in said first cell region.

23. The network node of claim 22, wherein the network node is operable to specify to said second network node at least one condition for which said second network node should report said resource activity per channel measurement.

24. The network node of claim 23, wherein said condition is selected from a group comprising:
- said radio resource-related data exceeds a predetermined threshold;
- said radio resource-related data falls below a predetermined threshold; and,
- a signal quality for a specified resource exceeds a predetermined minimum over a predetermined period of time.

25. The network node of claim 22, wherein said directing unit is further operable to direct said second network node to measure said resource activity for a plurality of channels and aggregate the measurements for reporting to said controller.

26. The network node of claim 22, wherein said directing unit is further operable to direct said second network node to measure and report said transmitted power samples exceeding said threshold for a plurality of channels and aggregate the measurements for reporting to said network node.

27. The network node of claim 22, wherein said directing unit is further operable to direct said second network node to report said channel quality samples for a plurality of channels in said neighboring cell region and aggregate the measurements for reporting to said network node.

28. The network node of claim 22, wherein said quality threshold is defined by a criteria selected from a group comprising:
- received total power on a channel;
- carrier-to-interference ratio (CIR);
- received signal strength indication (RSSI);
- block error rate (BLER); and,
- packet loss rate.

29. The network node of claim 22, wherein said network node is a centralized Radio Network Controller for directing a plurality of other network nodes to report said radio resource-related data.

30. The network node of claim 22, wherein said network node is co-located with said second network node, said second network node communicating with further network nodes to instruct such further network nodes to measure and report said radio resource-related data.

31. The network node of claim 22, wherein the second network node is a mobile terminal.

* * * * *